March 10, 1925.
K. BRCECINSKI
SHEARS
Filed Aug. 20, 1924
1,529,237
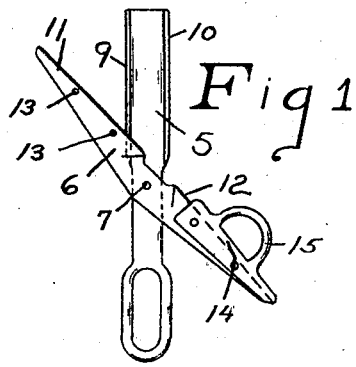
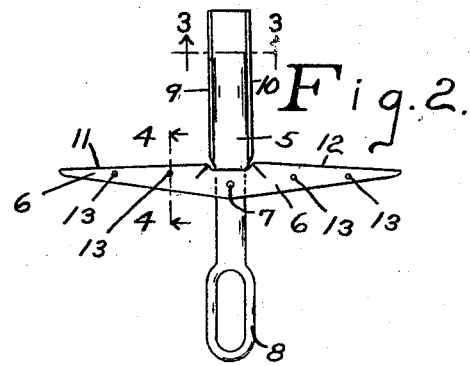
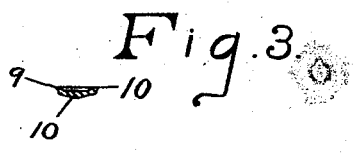
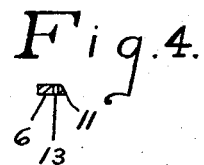
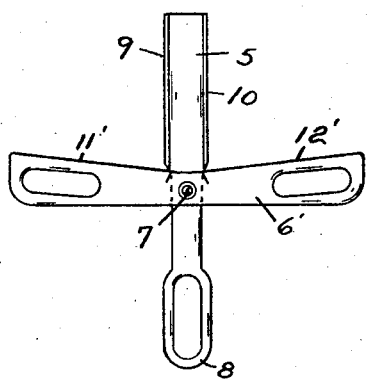
INVENTOR.
Karl Brcecinski
BY
Erwin, Wheeler & Woolard
ATTORNEYS.

Patented Mar. 10, 1925.

1,529,237

UNITED STATES PATENT OFFICE.

KARL BRCECINSKI, OF MAUSTON, WISCONSIN.

SHEARS.

Application filed August 20, 1924. Serial No. 733,224.

*To all whom it may concern:*

Be it known that I, KARL BRCECINSKI, a citizen of the United States, residing at Mauston, county of Juneau, and State of Wisconsin, have invented new and useful Improvements in Shears, of which the following is a specification.

This invention relates to improvements in shears.

It is the object of this invention to provide a construction having a plurality of sets of co-acting shear blades so that when one set of blades becomes dull an additional set will be conveniently available.

In the drawings:

Figure 1 is a plan view showing a pair of shears embodying this invention, one set of blades being in an operative position for use, and one blade of the remaining set being provided detachably with a handle.

Figure 2 is a plan view of the device shown in Figure 1 with the removable handle omitted, and with the shear blades in a position from which either pair of blades may be rendered operative.

Figure 3 is a sectional view taken in line 3—3 of Figure 2.

Figure 4 is a sectional view taken on line 4—4 of Figure 2.

Figure 5 is a plan view of a pair of shears embodying a modified construction.

Like parts are identified by the same reference characters throughout the several views.

This device contemplates the use of two shear members 5 and 6 which are pivoted together by means of a rivet, bolt, or like securing means 7 in any desired manner. Member 5 is formed at one end to provide a handle 8. Its other end is beveled along the margins 9 and 10 to provide operative shearing surfaces.

The member 6 preferably has its two ends constructed identically and is provided on corresponding margins 11 and 12 with operatively beveled shearing surfaces. Each end of the member 6 is provided with apertures at 13 which are adapted to receive bolts for securing interchangeably to the ends of member 6 a detachable handle member 14 which may include integrally a guard 15.

The arrangement is such that the shear margins 9 and 11 of blades 5 and 6, respectively, are adapted for operative shearing interaction, and so likewise are the margins 10 and 12 of blade members 5 and 6, respectively. The interchangeable handle 14 serves to cover and guard that shearing margin of member 6 which is not in operative use.

In Figure 5 I have illustrated a modified construction in which it is not even necessary to interchange a handle. In the modified device each end of blade member 6' is formed with apertures for the fingers or thumb of the operator, the whole device being so organized that either set of blades may be brought into use merely by oscillating blade member 6 to bring its blade surfaces 11' and 12' into operative proximity to blade surfaces 9 or 10, respectively, of blade member 5.

Inasmuch as the shearing margins of any shears are not sharp in the sense in which a knife is sharp, it is perfectly safe and practicable to construct double acting shears with a plurality of sets of interacting shear surfaces as disclosed herein.

I claim:

1. In a device of the character described, a pair of shear blade members in pivotal connection intermediate their respective ends, one of said members being formed to provide at one of its ends a permanent handle and having at the other end shearing surfaces extending along its opposite margins, and the other of said members being provided at each of its ends with shearing surfaces extending along one of its margins, the shearing surfaces of each end of the last mentioned member being adapted respectively for interaction with a shearing surface along one or the other margins of one end of the first mentioned member.

2. In a device of the character described, the combination with a first shear blade member including a handle at one end and a blade portion having substantially parallel shear margins at its other end, of a complementary shear member provided at both of its ends with operative shearing surfaces on corresponding margins, the shearing surface at one end of said complementary member being adapted for interaction with one of said parallel shear margins on the first mentioned member, and the shearing surface at the other end of said complementary member being adapted for interaction with the other of said parallel shear margins on said first mentioned member.

3. In a device of the character described, the combination of a pair of shear blade members intermediate their respective ends one of said members being provided at one end with an apertured portion comprising a permanent handle and at the other end with shear surfaces along its opposite margins, and the other of said members being provided at each of its ends with shear surfaces along corresponding margins, together with a handle member connected with said last mentioned member.

4. In a device of the character described, the combination of a pair of shear blade members in pivotal connection intermediate their respective ends, one of said members being provided at one end with a handle and at the other end with shear surfaces along its opposite margins, and the other of said members being provided at each of its ends with shear surfaces along corresponding margins, each end of said last mentioned member being provided with an aperture having a manually engageable surface, whereby to provide a plurality of handles adapted respectively and alternatively for use in connection with the handle of said first mentioned member.

KARL BRCECINSKI.